May 3, 1966 H. KARLBY ETAL 3,248,945
VISCOSITY COMPENSATED TURBINE FLOW METER
Filed Feb. 26, 1959 9 Sheets-Sheet 1

INVENTORS
HENNING KARLBY
WINSTON F. Z. LEE
BY
Strauch, Nolan & Neale ATTORNEYS

May 3, 1966 H. KARLBY ETAL 3,248,945
VISCOSITY COMPENSATED TURBINE FLOW METER
Filed Feb. 26, 1959 9 Sheets-Sheet 6

INVENTORS
HENNING KARLBY
WINSTON F. Z. LEE
BY
Strauch, Nolan & Neale
ATTORNEYS

May 3, 1966 H. KARLBY ETAL 3,248,945
VISCOSITY COMPENSATED TURBINE FLOW METER
Filed Feb. 26, 1959 9 Sheets-Sheet 7

INVENTOR
HENNING KARLBY
WINSTON F. Z. LEE

Strauch, Nolan & Neale
ATTORNEYS

United States Patent Office 3,248,945
Patented May 3, 1966

3,248,945
VISCOSITY COMPENSATED TURBINE
FLOW METER
Henning Karlby, Pittsburgh, and Winston F. Z. Lee, Verona, Pa., assignors to Rockwell Manufacturing Company, Pittsburgh, Pa., a corporation of Pennsylvania
Filed Feb. 26, 1959, Ser. No. 795,755
18 Claims. (Cl. 73—231)

The present invention relates to turbine meters and more particularly to improvements in such meters which render them substantially free of metering inaccuracies resulting from the viscosity effect of fluids of high viscosity.

This application is a continuation-in-part of our copending applications Serial No. 634,662 filed January 17, 1957, now U.S. Patent No. 3,163,041, Serial No. 717,863 filed February 27, 1958, now abandoned and Serial No. 717,922 filed February 28, 1958.

An example of a preferred form of turbine meter adapted for high metering accuracy of low viscosity fluids and having no viscosity compensation is disclosed in our copending application Serial No. 717,863 filed February 27, 1958.

It has been established theoretically and experimentally that the meter disclosed in said application is satisfactory for high accuracy measurement of fluids of low viscosity such as air, gases, water, gasoline, fuel oils, etc., but that without proper modification, it does not meet extremely high accuracy requirements such as ±0.1% allowable deviation over a flow range ($Q_{max}/Q_{min}$ of 5) for high viscosity fluids such as crude oils of high viscosity ranges from a minimum of 35 SUS to a maximum of 5000 SUS as required commercially, particularly where fluids of different viscosities must be metered by the same meter. The main trouble is due to the fact that in turbine meters of that type, the driving force is proportional to the square of flow ($Q^2$) whereas the resisting force ($F_r$) is proportional to an exponential power of flow ($Q$) less than the square in fluids of high viscosity, the exact magnitude of which depends upon the Reynolds number of the existing flow condition.

As is well known, the Reynolds number is a dimensionless expression which presents the characteristics of a fluid flow in terms of the velocity of the fluid, the dimensions of the element through which it flows, the density of the fluid, and the viscosity of the fluid. The Reynolds number is directly proportional to the velocity and density, and inversely proportional to the viscosity of the fluid.

In conventional practice, meter accuracy curves are plotted by graphically presenting the ratio of the turbine velocity to the rate of flow through the meter $\omega/Q$ versus the flow rate Q. Such a curve gives information about the meter accuracy when fluid of only one viscosity is metered. If fluid of another viscosity is to be metered, another accuracy curve is required to reflect the meter characteristics in fluid of the new viscosity.

After a great deal of study, it has been determined that a much more useful meter accuracy curve can be obtained by plotting the ratio of turbine speed to flow rate, $\omega/Q$ versus the Reynolds number of the flow through the meter taken at a significant point within the meter. It has further been determined that the Reynolds number of the flow through the turbine blades of the meter provides the best representation of flow characteristics through the meter. Thus, the "blade Reynolds number" is utilized as the base against which the ratio of turbine speed to flow rate $\omega/Q$ is plotted to give an extremely useful accuracy curve for a meter.

One particular advantage of such an accuracy curve is that fluids of various viscosities, when passed through the meter at varying flow rates, all yield points which may be plotted on this curve. In effect, there is but a single accuracy curve for the meter as opposed to the system in which the flow rate is utilied as the base for the accuracy curves and in which system a separate and distinct accuracy curve must be plotted for each viscosity of fluid that will pass through the meter.

To further illustrate this concept of Reynolds number accuracy curve, it will be seen that it is quite possible for a fluid of relatively low viscosity, flowing with a relatively low velocity, to have the same characteristic of flow—and Reynolds number—as a relatively viscous fluid flowing at a higher velocity. Further, each of these fluid flows will result in the same ratio of turbine speed to flow rate $\omega/Q$ so that they can be plotted as a single point in the Reynolds number accuracy curve. If, however, the two fluid flows were plotted as points on accuracy curves utilizing the flow rate as a base, they would be points on two separate curves, each of which would be peculiar to only fluid of the same viscosity as that utilized in the test.

In a conventional system of plotting the ratio of $\omega/Q$ versus rate of flow Q, the plot must be a horizontal straight line in order for the meter to accurately meter fluid of a given viscosity at all rates of flow. If fluid of another viscosity is to be metered, another accuracy curve must be plotted and this, too, must be a horizontal straight line if the meter is to accurately meter fluid of that viscosity. When utilizing a meter accuracy curve which depicts the ratio of turbine velocity to flow rate $\omega/Q$ versus the blade Reynolds number, only a single meter accuracy curve need be considered for fluids of all viscosities. If this accuracy curve is a horizontal straight line, the meter will accurately meter fluid of any viscosity at any flow rate.

Physically, no meter has yet been constructed which will accurately meter fluid over the entire range of Reynolds numbers. For all practical purposes, however, a range of Reynolds numbers for a specified metering purpose may be selected. Thus, considering the maximum and minimum flow rates and the maximum and minimum fluid viscosities desired for a particular application, a range of Reynolds numbers may be selected which will include all possible combinations of viscosities and flow velocities within the desired limits. A meter which has a horizontal straight line for a blade Reynolds number accuracy curve over the selected range of Reynolds numbers, will, accordingly, meet the specified metering requirements.

Experimental results indicate the turbine meter disclosed in our copending application Serial No. 717,863 has a straight line blade Reynolds number number accuracy curve over the high Reynolds number range. However, at the lower Reynolds numbers—which are a result of high viscosities—the accuracy curve of the meter does not remain a horizontal straight line. Instead, the Reynolds number accuracy curve of a turbine meter of that type will have a "hump" in fluids of high viscosity for flows within the operating range rather than a flat curve as in fluid of low viscosity. It is therefore necessary to introduce some special device into a turbine meter of that type to eliminate the viscosity effect of fluid of high viscosity on the meter accuracy.

The present invention therefore contemplates the provision of a special turbine meter for accurately metering and recording the flow of viscous and extremely viscous fluids and comprises a metering turbine disposed in a conduit in the path of fluid flowing through the conduit and means for substantially eliminating the viscosity effect of the fluid as it passes through the metering turbine.

With the foregoing considerations and purposes in mind, it is the major object of this invention to provide means for changing the natural Reynolds number accuracy curve of the meter disclosed in our copending application Serial No. 717, 863 so that the resulting changes will flatten the accuray curve in the range of lower Reynolds numbers and allow fluids of higher viscosity to be accurately metered.

It is further the object of this invention to provide an improved axial flow turbine for substantially eliminating variations between the absolute meter inlet fluid velocity and the absolute discharge fluid velocity engendered by the viscous drag of the fluid being metered.

It is further the object of this invention to provide an improved axial flow turbine embodying a rotatable metering turbine and means for compensating for the slip of the turbine due to the viscous drag of the fluid, thereby maintaining a linear relationship between the angular speed of the turbine and the volume rate of the fluid passing through the turbine.

It is a further object of this invention to provide an improved axial flow turbine for embodying a flow restriction to generate turbulence in the fluid being metered at a predetermined distance upstream of the register driving metering turbine for lowering the critical Reynolds number of the fluid, the effect of which is to increase the range of linear flow measurements with respect to the Reynolds number of the fluid.

Figure 6:
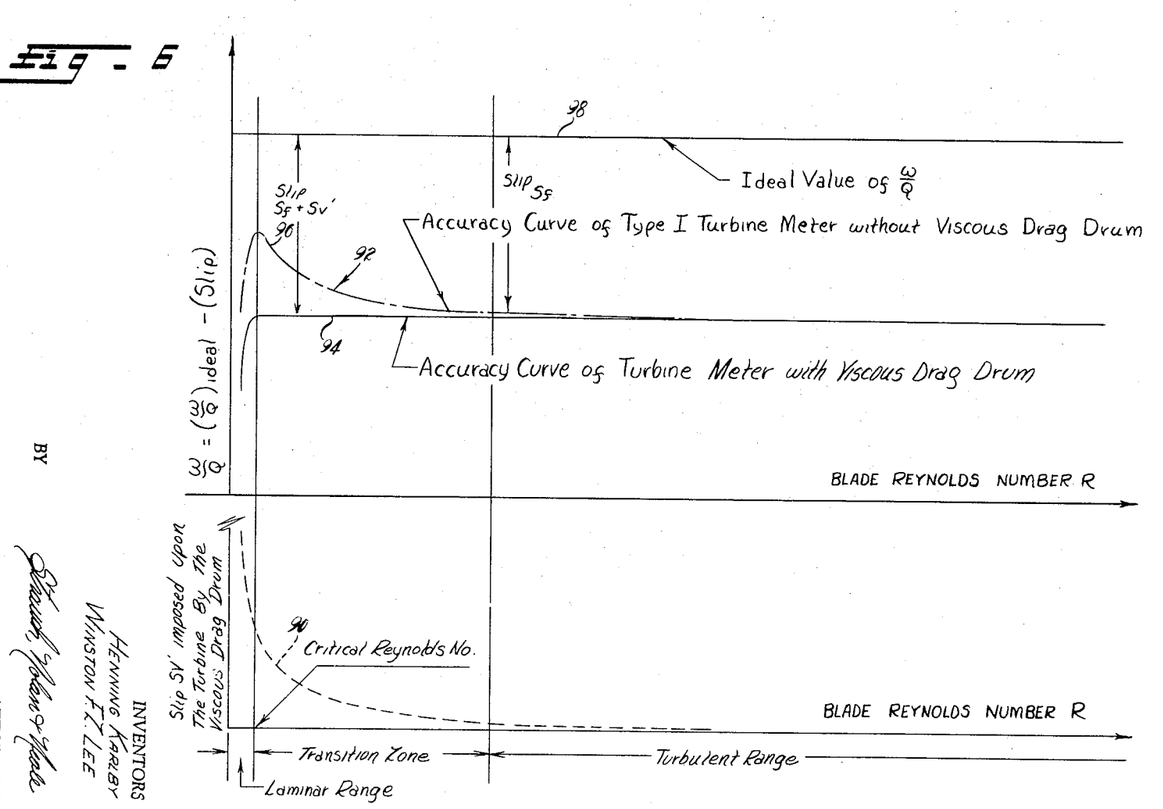
FIGURE 6 is a plot illustrating the improvement of the blade Reynolds number accuracy curve of a turbine meter due to the controlled viscous drag device provided on the metering turbine.

It is further the object of the present invention to provide a controlled viscous drag device to the metering turbine, the effect of which is to produce an additional resisting moment always of a viscous drag nature within the entire operating range of the meter to bring down the hump of the Reynolds number accuracy curve (as shown in FIGURE 6). This device will yield an essentially flat accuracy curve down to the critical Reynolds number.

It is further the object of the present invention to provide an improved axial flow turbine meter embodying a free counter-rotating turbine with a controlled viscous drag device disposed coaxially with and at a proper distance upstream of the register driving metering turbine, the effect of which is to create an additional driving force of the meter turbine and to substantially eliminate metering registration inaccuracies attributable to the viscosity of the fluid being metered.

More specifically, it is an object of this invention to provide an axial flow turbine meter embodying a free counter-rotating turbine having an additional viscous drag surface, the magnitude of which is adjustable and which is disposed coaxial with and at a proper distance upstream of the meter turbine and in which the blade angle of the blades of the free turbine is so correlated to the blade angle of the blades of the meter turbine that the absolute exit velocity of fluid from the metering turbine is substantially free of any tangential component regardless of the different viscosities of different fluids.

A further specific object of this invention is to provide an axial flow turbine meter embodying a free counter-rotating turbine disposed coaxial with and at a proper distance upstream of the meter turbine and having a viscous drag cup mounted for rotation with the counter-rotating turbine for inflicting a viscous drag force, the magnitude of which is adjustable and is a function of the viscosity of the metered fluid so that the free turbine is effective to impart a tangential component to the absolute exit velocity of fluid passing therethrough which is substantially equal and opposite to the change in the tangential component of the velocity of the fluid as it passes through the meter turbine.

It is a further object of this invention to provide a novel axial flow turbine meter embodying a zero blade angle metering turbine where the profile drag on the rotor blades acts only along the axial direction of the turbine, the effect of which is to eliminate the viscosity effect of the fluid being metered.

These and other objects of the present invention will become more fully apparent as the description proceeds in connection with the appended claims and the annexed drawings wherein:

This disclosure of the present invention will proceed with an analysis of the operation of turbine meters and the relation thereof to the embodiments of the present intion followed by a detailed description of the constructions embodying the principles of the present invention which includes a detailed explanation of the significance of each of the several aspects of the present invention.

FIGURES 1, 2, 5, 7 and 9–11 illustrate turbine meters constituting practical embodiments of the principles of the present invention for use in metering fluids of various viscosity. Referring now to FIGURE 12, velocity vector diagrams are illustrated for the synchronous speed condition of a turbine meter without viscosity compensation as illustrated in FIGURE 19 of the above-identified copending application (Serial No. 717,863) and hereinafter referred to as the Type I turbine meter.

With continued reference to FIGURE 12, the velocity $v_1$ is the absolute velocity of the fluid at the inlet to the metering element or the metering turbine, velocity $v_2$ is the absolute discharge velocity of the fluid from the metering element and velocity $r\omega$ is the linear velocity at a radius $r$ of the metering element rotating with an angular velocity $\omega$. Velocity $v_{R2}$ is the discharge velocity of the fluid relative to the rotating metering turbine. For a particle of fluid moving along the blade with a velocity $v_R$ relative to the blade, the particle will leave the blade at A with the velocity $v_{R2}$ if the blade is at rest. If the blade is moving in direction shown with a magnitude $r\omega$, and the velocity of the particle still has a velocity $v_R$ relative to the blade, and remains in contact with the blade to the end A, the absolute velocity of the fluid as it leaves the blade at A will be the vector sum of the velocities $v_{R2}$ and $r\omega$. Thus, the vectorial sum of the turbine velocity and the relative velocity will yield the absolute discharge velocity $v_2$. In a theoretically perfect system where no resisting torques are encountered in passage of the fluid through the metering element, the absolute discharge velocity would be vectorially equal to the absolute inlet velocity of the fluid being metered since there would be no slip of the turbine. Hence, all of the fluid passing between the blades of the turbine would be metered and recorded and the value of the ratio $\omega/Q$ would be the ideal value indicated by the horizontal straight line in FIGURE 4. Under actual conditions, however, there are resisting forces, as will be described, of such nature and magnitude to cause significant turbine slip and thereby affect the accuracy of the meter unless compensated for. As used in this application, "slip" will broadly designate those effects which tend to bring the actual value of the ratio of turbine speed to flow rate $\omega/Q$ below the ideal value that would result if all the fluid passing through the turbine were metered and recorded. This turbine slip due to prevailing forces resisting the rotation of the turbine is evinced by and directly related to the tangential velocity component $v_{t2}$ of the fluid flowing through the turbine. Such a tangential velocity vectorially adds to the absolute inlet velocity $v_1$ to give the resultant absolute discharge velocity $v_2$. As the viscosity of the fluid changes, the resisting force is changed for a given flow rate, resulting in a corresponding change in the tangential velocity $v_{t2}$ especially in the region of the lower Reynolds numbers. This change of the tangential velocity $v_{t2}$ results in turn in a varying turbine slip which is effective to adversely affect the accuracy of metering registration.

The following analysis serves to exemplify the effect that the resisting forces resulting from fluid friction and mechanical friction have on the accuracy of a turbine meter.

*Analysis of the turbine meter in fluids of high viscosities*

By means of flow straighteners and proper design of the turbine housing and approaching hub, the inlet velocity $v_1$, to the blades of the turbine can be assumed to be purely axial and uniformly distributed across the entire annular flow passage leading to the metering turbine.

Figure 1:
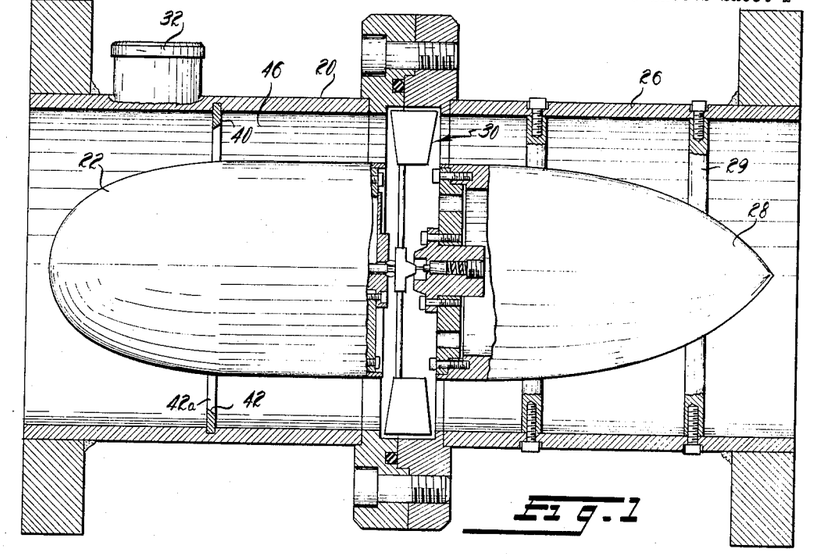
FIGURE 1 is a longitudinal sectional view of a turbine meter illustrating one embodiment of the present invention.

Consider first the turbine meter of FIGURE 1 being steadily rotated in synchronous conditon by a fluid of high viscosity and having the velocity diagrams shown in FIGURE 12. Since the driving force $F_d$ exerted upon the turbine by the fluid can be no greater than the resisting force $F_r$ of the turbine, it will be useful to analyze the resisting forces on the turbine and to consider their nature.

It can easily be shown by basic laws of fluid dynamics that the driving force $F_d$ exerted on the turbine is equal to the mass rate of flow $\dot{m}$ through to the meter multiplied by the change in absolute tangential velocity $v_{t2}$ of the fluid passing through the meter or $$F_d = \dot{m} v_{t2}$$

The mass rate of flow $\dot{m}$ is equal to the density of the fluid $\rho$ multiplied by the volumetric rate of flow $Q$ or $\dot{m} = \rho Q$.

Now, if the turbine were in the ideal state, having no resisting forces of any kind, the turbine would move in exact timed relation to the fluid flow and no force would be required to drive it or $F_d$ would be zero. This is readily apparent since the fluid would not be deviated in a tangential direction as it passed through the turbine so that $v_2$ would equal $v_1$ (FIGURE 12) and $v_{t2}$ would equal zero.

It is unnecessary to note that this ideal condition cannot exist and that the turbine has resisting forces which must be overcome by the force created by the fluid flowing through the meter. In a meter turbine, as opposed to a power turbine, the forces $F_r$ to be overcome by the driving force $F_d$ are relatively small. They may be conveniently considered to be of two classes. The first is a resistance force $F_m$ due to the mechanical resistance of the friction created by the bearing loads and the register load. Because of the construction of the turbine meter with magnetic shaft suspension, magnetic register drive and low-torque register, as fully discussed in our copending application 717,863, the mechanical resistance force $F_m$ is held to a minimum. Further, it is relatively constant and independent of the flow rate $Q$. For these reasons, the mechanical resisting forces $F_m$ have no appreciable effect on the accuracy of the turbine meter in its operating flow range and may be disregarded for the purposes of this analysis.

The second resisting force which must be considered is the force due to the fluid friction acting upon the rotating parts of the meter. While the fluid exerts a resisting force on the spokes of the turbine, the hub of the turbine, and all other rotating parts, it has been found that the greatest resistance force acts upon the blades of the turbine. By proper design of the turbine, it is possible to minimize the fluid resisting force acting upon the parts of the turbine other than the blades so that it is only a very small fraction of the resisting force acting upon the turbine blades. For the purposes of this discussion, the resisting force acting upon all parts of the turbine except the blades may be considered to be negligible. The resisting force $F_f$ created by the fluid friction acting upon the blades of the turbine should be considered in some detail to gain an understanding of the present invention.

However, before considering the fluid friction resisting force $F_f$ acting upon the turbine blades, some attention will be given to the characteristics of flow through the turbine meter. Considering for the moment a fluid of fixed viscosity and density flowing through the meter, at very low fluid velocities, the flow through the meter is laminar. As the fluid velocity increases, areas of turbulence develop until finally, the flow of fluid through the meter becomes completely turbulent.

Just when this change of flow characteristic takes place depends upon the nature of the fluid flow passage. For any turbine meter, there is fluid velocity for any particular fluid below which turbulent flow cannot take place and all flow is laminar. Since this flow rate is for a particular fluid (i.e., a fixed density and viscosity) and through a particular flow passage (i.e., the blade area of the turbine meter), it may be expressed in terms of the Reynolds number. Thus, the Reynolds number below which only laminar flow takes place is designated as the critical Reynolds number and is so indicated on FIGURE 3.

The high Reynolds numbers indicate the range where the flow is completely turbulent. The change of the flow characteristics from a laminar flow to completely turbulent flow is not an instantaneous occurrence at the critical Reynolds number. Rather, because of the nature of flowing fluid, there is a transition zone embracing those Reynolds numbers immediately to the right (FIGURE 3) of the critical Reynolds number in which the flow is partially turbulent and partially laminar. This area creates difficulties in predicting exactly how the turbine will behave. However, since the present invention teaches the use of a single blade Reynolds number accuracy curve to show the characteristics of the meter, it is possible—by utilizing this accuracy curve—to analyze the effects of the flow in the complete range of Reynolds numbers and to compensate for them in a manner to be described.

Returning now to the resisting force $F_f$ acting upon the blades as a result of the fluid friction, it is this force which creates the major deviations from the ideal in the blade Reynolds number accuracy curve. To indicate just how these forces affect the turbine operation, the fluid resisting force $F_f$ for each of the three ranges of flow patterns—laminar flow, turbulent flow and transition zone—are analyzed and their nature determined.

In the laminar flow range, the fluid friction resisting force created by the fluid passing over the turbine blades is of a viscous nature and will be designated $F_v$. This resisting force $F_v$ acts parallel to the blade surface and so has a tangential component which is opposed to the turbine driving force $F_d$. This resisting force $F_v$ is the predominant cause of the change of tangential velocity $V_{t2}$ through the turbine in the laminar flow range. To determine the nature of the resisting force $F_v$ due to viscosity, reference may be had to the basic force equation in which $$F_d' = \rho Q v_{t2}'$$

Here, the driving force $F_d'$ required to overcome the viscosity resisting force $F_v$ is equal to the density $\rho$ times the volumetric rate of flow $Q$ times the change in tangential velocity due to the viscous friction of the fluid $v_{t2}'$. Since the resisting force $F_v$ due to the viscosity effect is proportional to the viscosity $\mu$ of the fluid times the volumetric rate of flow $Q$, it may conveniently be expressed as $$F_v = K\mu Q$$

where $K$ = a proportionality constant. The term K hereinafter will be utilized indiscriminately to designate any undefined proportionality constant without subscripts or modifications except that $K'$ will be utilized when two different constants appear in the same equation. Two different constants in the same equation will be designated as $K$ and $K'$.

Since the driving force $F_d'$ required to overcome the resisting force $F_v$ due to viscous friction must be equal to the resisting force $F_v$ in the synchronous condition, the last preceding equations may be equated to each other so that $$\rho Q v_{t2}' = K\mu Q$$

Solving for the change in velocity due to the viscosity effect $V_{t2}'$, it will be seen that $$V_{t2}' = K\mu/\rho$$

Thus, tangential velocity change $v_{t2}'$ due to the resisting force $F_v$ of the viscosity effect is directly proportional to the fluid viscosity $\mu$ and inversely proportional to the fluid density $\rho$.

In the turbulent flow range, the fluid friction resisting force which acts upon the turbine blades is of a tubulent nature and will be designated $F_t$. Here, too, the turbulent friction resisting force $F_t$ acts along the surface of the turbine blades so that it has a tangential component which resists the rotary motion of the turbine.

As before, the driving force $F_d''$ required to overcome the turbulent resisting force $F_t$ is equal to the density of the fluid $\rho$ times the volumetric flow rate $Q$ times the change in tangential velocity of the fluid through the turbine $v_{t2}''$ or $$F_d'' = \rho Q v_{t2}''$$

Further, the resisting force $F_t$ exerted on the turbine by the effect of turbulent flow is proportional to the density $\rho$ times the square of the volumetric flow rate $Q$ or $$F_t = K\rho Q^2$$

At synchronous condition, the driving force is equal to the resisting force or $$\rho Q v_{t2}'' = K\rho Q^2$$

Solving for the change of tangential velocity $v_{t2}''$ due to the turbulent effect of the fluid $$v_{t2}'' = KQ$$

Thus, the velocity change $v_{t2}''$ due to the resisting force $F_t$ of the turbulent friction effect of the fluid upon the blades is directly proportional to the flow rate $Q$ and is independent of the viscosity $\mu$ of the fluid.

The resisting force $F_z$ due to fluid friction in the transition zone results from various combinations of a turbulent friction resisting force $F_t$ and a laminar or viscous friction resisting force $F_v$. It has been determined that the frictional resisting force $F_z$ of the fluid friction in the transition zone may be expressed by the following equation:

$$F_z = K\rho Q^2 - K'\mu Q$$

The expression $K\rho Q^2$ is of the same nature as the turbulent resisting force $F_t$ and the expression $K'\mu Q$ is of the same nature as the viscous resisting force $F_v$.

As before, the driving force $F_d'''$ required to overcome the fluid friction in the transition zone may be expressed by the basic force formula $$F_d''' = \rho Q v_{t2}'''$$

Since the driving force $F_d'''$ must equal the resisting force $F_z$ in the synchronous condition, the last previous equations may be equated to each other. Thus, $$\rho Q v_{t2}''' = K\rho Q^2 - K'\mu Q$$

and solving for the change in tangential velocity $v_{t2}'''$ due to the transition resisting force $F_z$ $$v_{t2}''' = KQ - K'\mu/\rho$$

Figure 4:
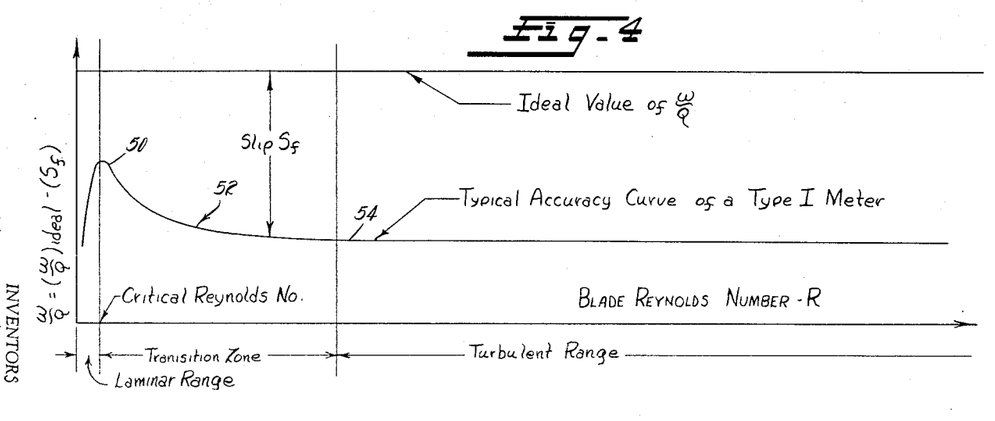
FIGURE 4 is a plot illustrating the "blade Reynolds number accuracy curve" or the relation between the angular velocity of the metering turbine per unit volume of fluid flow and the blade Reynolds number of the fluid flow.

Having determined the tangential velocity changes in the fluid $v_{t2}'$, $v_{t2}''$ and $v_{t2}'''$ due to the fluid friction resisting forces $F_v$, $F_t$ and $F_z$ in the laminar flow range, the turbulent range and the transition zone respectively, it now will be determined how these tangential velocity changes affect the meter accuracy curve. In order to consider this situation, it must be remembered that the change in tangential velocity $v_{t2}$ directly evinces turbine slip. If no resisting forces acted upon the turbine, the tangential velocity change $v_{t2}$ would be zero and the ratio of turbine velocity to flow rate $\omega/Q$ would be ideal, as shown in FIGURE 4. Since it is the ratio of turbine velocity to flow rate $\omega/Q$ which must be constant in order for the turbine to accurately meter fluid, it is necessary to see how the changes of tangential fluid velocity $v_{t2}$ affect this ratio. The amount that the turbine slips, or registers below the ideal value of the ratio $\omega/Q$, will be directly proportional to the amount that the tangential velocity of the fluid $v_{t2}$ changes, divided by the flow rate $Q$. Thus, the slip of the turbine will be equal to $Kv_{t2}/Q$. Since $v_{t2}$ is a linear velocity tangent to the turbine, it must be divided by some radius $r$ to correctly express the ratio of $\omega/Q$. However, for a particular turbine, the radius $r$ will be a constant so that the expression $Kv_{t2}/Q$ is an accurate expression of the slip $S_f$ in terms of the change of tangential velocity $v_{t2}$ of the fluid and the flow rate $Q$.

Referring now to the expressions for the changes of tangential velocities of the fluid in the laminar range, the turbulent range and the transition zone, it will be seen that the slip $S_f$ of the turbine in each of the ranges may be expressed merely by multiplying the expressions for the tangential velocity changes by the term $K/Q$.

Thus, in the laminar flow range, the tangential velocity change $v_{t2}'$ due to the viscosity resisting force $F_v$, when multiplied by the term $K/Q$ yields the expression for the turbine slip $S_f'$ due to the viscosity force $F_v$ or:

$$\frac{K}{Q}v_{t2}'$$

wherein $\quad v_{t2}' = K\dfrac{\mu}{\rho}$

Thus, $$S_f' = \frac{K\mu}{\rho Q}$$

It will further be noted that the expression of $S_f'$ makes it proportional to the fluid viscosity $\mu$ and inversely proportional to the fluid density $\rho$ and the flow rate $Q$. This expression, then, is inversely proportional to the Reynolds number $R$ for the particular turbine meter or:

$$S_f' = K/R$$

In the turbulent range, the change in the tangential velocity $v_{t2}''$ due to the turbulent resisting force $F_t$, when multiplied by the term $K/Q$ yields the expression for the turbine slip $S_f''$ due to the turbulent force $F_t$ or $$\frac{K}{Q}v_{t2}''$$

wherein $v_{t2}'' = KQ$

Thus, $S_f'' = K$

It will be noted that in the turbulent range, the slip $S_f''$ is constant, which does not impair the meter accuracy.

In the transition zone, the tangential velocity change $v_{t2}'''$ due to the fluid resisting force $F_z$, when multiplied by the term $K/Q$ yields the expression for the turbine slip $S_f'''$ due to the resisting force $F_z$ or $$\frac{K}{Q}v_{t2}'''$$

wherein $v_{t2}''' = KQ - K'\frac{\mu}{\rho}$

Thus, $$S_f''' = K - \frac{K'\mu}{\rho Q}$$

As has been previously stated in discussing the slip due to the viscosity resisting force $F_v$, the expression $K\mu/\rho Q$ is inversely proportional to the Reynolds number of the particular turbine meter involved or $$S_f''' = K - K'/R$$

Figure 3:
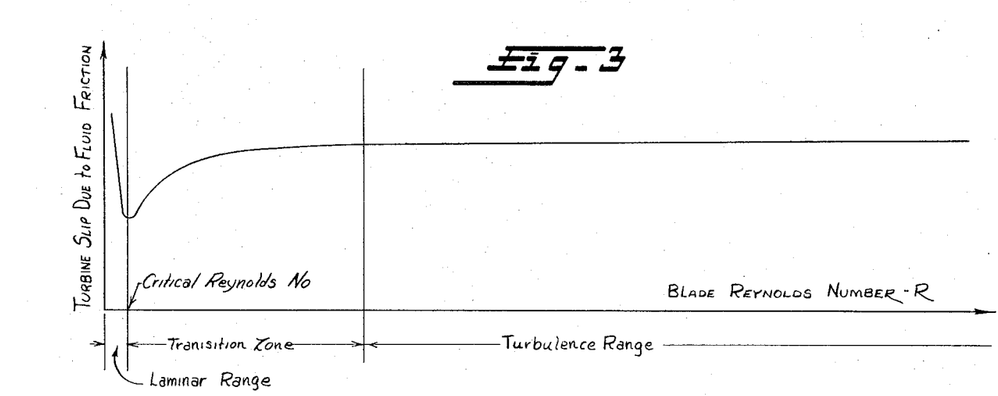
FIGURE 3 is a plot illustrating the relation between total turbine slip ($S_f$) due to fluid friction and the blade Reynolds number of the fluid flow.

Referring now to FIGURE 3, it may be seen that the slip $S_f$ of the meter throughout the range of Reynolds numbers is plotted. In the laminar range, the slip $S_f$ varies in accordance with the expression $$S_f = K/R$$

as the slip is due to the viscous resisting force $F_v$.

As the Reynolds number increases to a value above the critical Reynolds number, the flow characteristics change and the slip $S_f$ varies in accordance with the expression $$S_f = K - K'/R$$

as the slip $S_f$ is due to the fluid resisting force $F_z$.

When the Reynolds number increases to a value above which the flow is completely turbulent, an area of constant slip in accordance with the expression $$S_f = K$$

is entered since the slip is due to the fluid resisting force $F_t$.

The blade Reynolds number accuracy curve of the Type I turbine meter is represented in FIGURE 4. As hereinbefore described, the ideal value of the ratio of turbine speed to volumetric flow rate $\omega/Q$ would be a horizontal straight line over the entire range of Reynolds numbers, as indicated on FIGURE 4. However, the turbine resisting forces just discussed cause a slip $S_f$ of the turbine which varies over the range of Reynolds numbers. This slip $S_f$, when subtracted from the theoretical value of the ratio of $\omega/Q$ yields the Reynolds number accuracy curve. The accuracy curve for the Type I turbine meter, as shown in FIGURE 4, has been completely verified by experimental results. It has a hump around the critical Reynolds number before it reaches the flat part of the curve. For fluids of low and medium viscosities (such as air, natural gas, gasoline, water, thin oils, etc.) a Type I turbine meter of reasonable size (4 inch size and above) will mainly operate on the flat part of the accuracy curve for a reasonable flow range. However, in case of fluids of high viscosity, the accuracy curve will include the hump as well as the flat part, resulting in rather large maximum deviation. The critical Reynolds number of a turbine meter depends somewhat upon the initial turbulence of the flow before entering the turbine and the particular design of the meter. The higher the initial turbulence, the lower the critical Reynolds number. For the turbine meter shown in said copending application Serial No. 717,863, this critical value of the blade Reynolds number is found by actual test to be about 2300.

Extensive tests in a great variety of fluids (air, natural gas, gasoline, Stoddard solvent, thin oil and thick oil) of the turbine meter disclosed in said copending application Serial No. 717,863 and several other models designed according to the above analytical findings show a good agreement between the experimental results and theoretical analysis.

Figure 2:
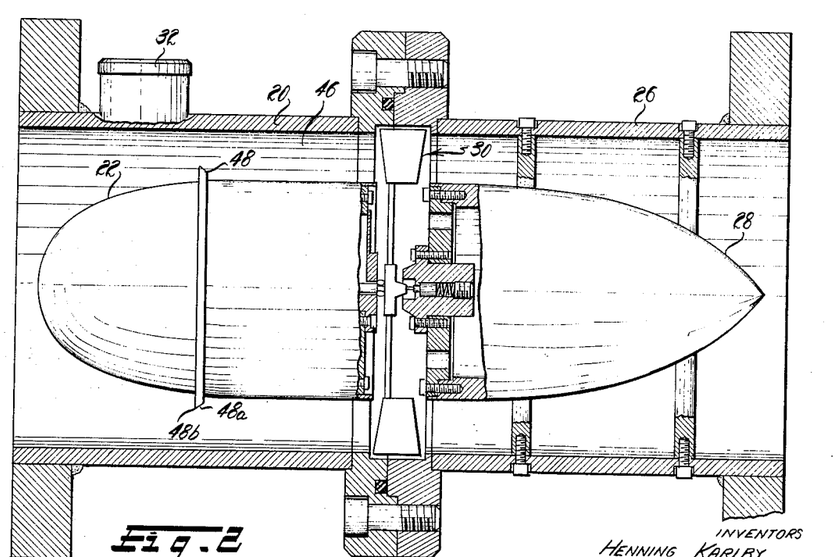
FIGURE 2 is a longitudinal sectional view of a turbine meter illustrating a further embodiment of the present invention.

FIGURES 1 and 2 illustrate one practical construction embodying the principles of the invention wherein a turbulence generating device in the form of a flow restriction, as will be described, is located a predetermined distance upstream from the turbine rotor to intentionally establish a large initial turbulence in the fluid flowing to the metering turbine. This large initial turbulence lowers the critical Reynolds number and thereby extends the turbulent range of the fluid so that a longer linear flow measurement range is available. The turbulence generated in the fluid stream further provides for a more uniform velocity distribution, particularly in the laminar flow range which also improves the meter accuracy of the meter for fluids flowing in this range.

With continued reference to FIGURES 1 and 2, the axial flow turbine meter therein shown comprises a cylindrical inlet conduit 20 having a faired core section 22 supported coaxially therein by equiangularly spaced longitudinally extending ribs (not shown) and an outlet conduit section 26 having a faired core section 28 supported coaxially therein by spaced struts 29. The core section 22 journals a meter turbine 30 and contains a drive train to register within register housing 32, all of which, with the exception explained below, is of identical structure to the structure shown in our said co-pending application Serial No. 717,863, the disclosure of which is hereby adopted and incorporated herein by reference and thus requires no further detailed disclosure or explanation herein.

With continued reference to FIGURE 1, the exception referred to above resides in the provision of a flow restriction in the form of a sharp edged orifice plate 40 having an inner frusto conical surface 42 beveled radially outwardly to define sharp circular edge 42a facing the flow of fluid. The orifice plate 40 is concentrically mounted in the tubular meter housing conduit 20 at the entrance to the annular channel 46 formed by the conduit 20 and core section 22 so that turbulence is created as the fluid passes into the orifice plate.

Refering now to FIGURE 2, the surface illustrated therein for generating turbulence in the fluid stream comprises an annular plate 48 concentrically mounted on core section 22 at the entrance to the annular channel 46. This orifice plate 48 has an outer frusto conical surface 48a beveled radially inwardly to define a sharp turbulence producing edge 48b facing the flow of fluid.

The orifice plates 40 and 48 of FIGURES 1 and 2 respectively are spaced a sufficient predetermined distance upstream from the metering rotor 30 so that the initial turbulence established in the fluid does not impair the meter accuracy due, for example, to the eddy currents adjacent the discharge end of the the orifice plates.

Consequently, it will be appreciated that the orifice plates 40 and 48 of the embodiments of FIGURES 1 and 2 respectively generate a large initial turbulence at a predetermined distance upstream from the turbine rotor 30. This increased turbulence lowers the critical Reynolds number as hereinbefore described so as to establish a greater linear flow measurement range. Thus, with reference to FIGURE 4, the hump 50 defined by the accuracy curve 52 at the critical Reynolds number is shifted back toward the ordinate axis to increase the range of the flat curve portion indicated at 54.

While the orifice plates 40 and 48 constitute the preferred generating device, the initial turbulence may also be generated or established by other devices such as a series of screens spaced a desirable distance upstream from the metering turbine.

While the establishment of initial turbulence will lower the critical Reynolds number of the turbine meter, experiments indicate that a lower limit exists, the value of which depends upon the meter design and is independent of the amount of disturbance produced. Thus, where the Reynolds number is below this lower limit, all initial disturbances, no matter how severe, are damped out and the motion consequently falls in the laminar range as the fluid enters the metering turbine. Therefore, the establishment of large initial distrubances in the fluid flowing to the metering turbine to hasten the transition from a laminar flow to a turbulent flow is satisfactory only for fluids of not very high viscosity. Consequently, where high accuracy of fluid measurement is required for fluids of high viscosity, other means for viscosity compensation are employed.

Figure 5:
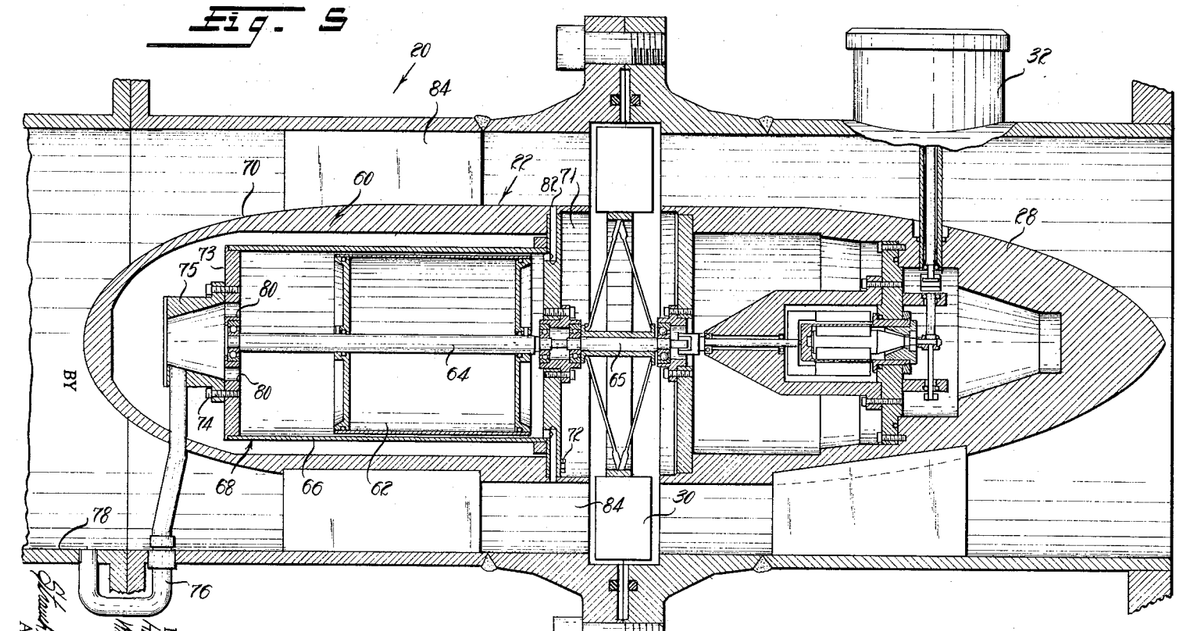
FIGURE 5 is a longitudinal sectional view of a turbine meter illustrating another embodiment of the present invention in which the metering turbine is equipped with a controlled viscous drag device in the form of a viscous drag drum.

Referring now to FIGURE 5, a further construction embodying the principles of the present invention is illustrated. This embodiment of the invention is adapted for metering viscous fluids and is also identical to that of said co-pending application Serial No. 717,863 except for the addition of a viscous drag device 60 to the metering turbine.

With continued reference to FIGURE 5, the viscous drag device 60 comprises a viscous drag drum 62 nonrotatably fixed to a coaxial extension 64 of the meter turbine shaft 65 so that the drum rotates with the turbine shaft. The drum 62 is a hollow, sealed unit with a diameter of such size as to establish a selected close running clearance with the interior wall 66 of the cup 68. Cup 68 is mounted at one end coaxially with the meter turbine 30 within a hollow fluid guide and core section 70 on a flange plate 71 which is secured to the guide member by bolts 72 or other suitable means.

A flat circular end plate 73 is mounted at the upstream open end of the cup 68 to close off the interior thereof from the interior of the guide member 70. Affixed to the plate 73 by bolts 74 or other suitable means is a hollow receiver cup 75 coaxial with the shaft extension 64.

In order to transport a portion of the fluid which is about to be metered to the receiver cup 75, a small tap-off pipe line 76 of selected diameter is provided and connects at one end to the main fluid transporting pipe line 78 a predetermined distance upstream from the fluid guide member 70.

The other end of the tap-off pipe line 76 terminates in the cup 75 so as to communicate with the interior thereof. Thus, a predetermined portion of fluid to be metered which is flowing through the pipe line 78, enters the tap-off pipe line 76 and is conveyed to the interior of the cup 75. This fluid is transferred from the cup 75 through a series of apertures 80 formed in end plate 73 into the recess formed by cup 68 and flows between the interior wall 66 and the drum 62 to radial discharge passageways 82 formed in the flange plate 71. The radially formed discharge passageway 82 open into the annular passageway 84 formed by the meter core section 70 and the tubular meter casing 20 upstream from the turbine meter 30 so as to facilitate the return of the tapped-off fluid to the main body of fluid which is about to be metered.

Consequently, it will be appreciated from the foregoing that the fluid entering the cup 68 which surrounds the drum 62 is always of the same kind and has essentially the same viscosity as the fluid being metered in the main passage 84. The magnitude of the running clearance between the drum 62 and the cup 68 is such that the flow of fluid therebetween is laminar in nature within the meter operating range. Thus, as the drum 62 is rotated a viscous shear force $F_v'$ is established to resist rotation of the drum. This resisting force $F_v'$ is of the same nature hereinbefore referred to, the magnitude of which is a function of the amount of surface area of the drum 62. This force $F_v'$, therefore, may be varied as required by axially shortening or lengthening the drum to respectively provide for a lesser or greater drum resisting force.

The viscous resisting force $F_v'$ acting on the drum causes a slip $S_v'$ to be imposed upon the turbine in addition to the slip $S_f$ which is established by the fluid resisting force $F_f$ as the fluid passes through the meter 30. Since the slip $S_v'$ is of the same nature as the slip $S_r'$ caused by the fluid viscosity resisting force $F_v$, the additional slip imposed upon the turbine is $S_v' = K/R$ which when plotted versus the Reynolds number has a curve of the nature of the dotted line 90 of FIGURE 6.

Without the compensatory slip $S_v'$ provided by the viscous drag device 60, the meter of FIGURE 5 is essentially a type I turbine meter and the meter accuracy curve will take the form of curve 92 that is essentially the same as the accuracy curve of a type I turbine meter hereinbefore referred to which is not equipped with the viscous drag device 60.

With continued reference to FIGURE 6, when the type I turbine meter is equipped with the viscous drag device 60 hereinbefore described, the resulting accuracy curve for that meter will be curve 94. By adjusting the length of the drum 62, the resisting force $F_v'$ and consequently the slip $S_v'$ is varied until, at the critical Reynolds number, the slip $S_v'$ is equal to the difference in the slip $S_f$ imposed upon the turbine in the turbulent range minus the slip $S_f$ imposed upon the turbine at the critical Reynolds number. This magnitude of slip $S_v'$ due to the viscous drag on the drum 62 which when added to the natural slip $S_f$ therefore has the effect of flattening the natural Reynolds number accuracy curve 92. The curve resulting from the addition of the slip $S_v'$ and $S_f$ is designated at 94 and does not have the hump 96 of the curve 92. Since the Reynolds number accuracy curve 94 is substantially flat above the critical Reynolds number, the meter illustrated in the embodiment of FIGURE 5 will therefore accurately meter fluids at all flow conditions above the critical Reynolds number. The accuracy of a turbine meter having an accuracy curve indicated at 94 is clearly evinced by the fact that the accuracy curve 94 and the ideal value curve $\omega/Q$ designated at 98 of FIGURE 6 are substantially parallel in the Reynolds number ranges above the critical Reynolds number. Consequently, since the slip $S_f$ is constant in ranges above the critical Reynolds number, determination thereof will provide for accurate metering of the fluid.

To further increase the accurate metering range, both the viscous drag device 60 of FIGURE 5 and the turbulence generating device of either FIGURE 1 or FIGURE 2 may be incorporated into a type I turbine meter so as to provide for an accurate metering range which is greater than the metering ranges established when either of the devices is used alone.

Figure 7:
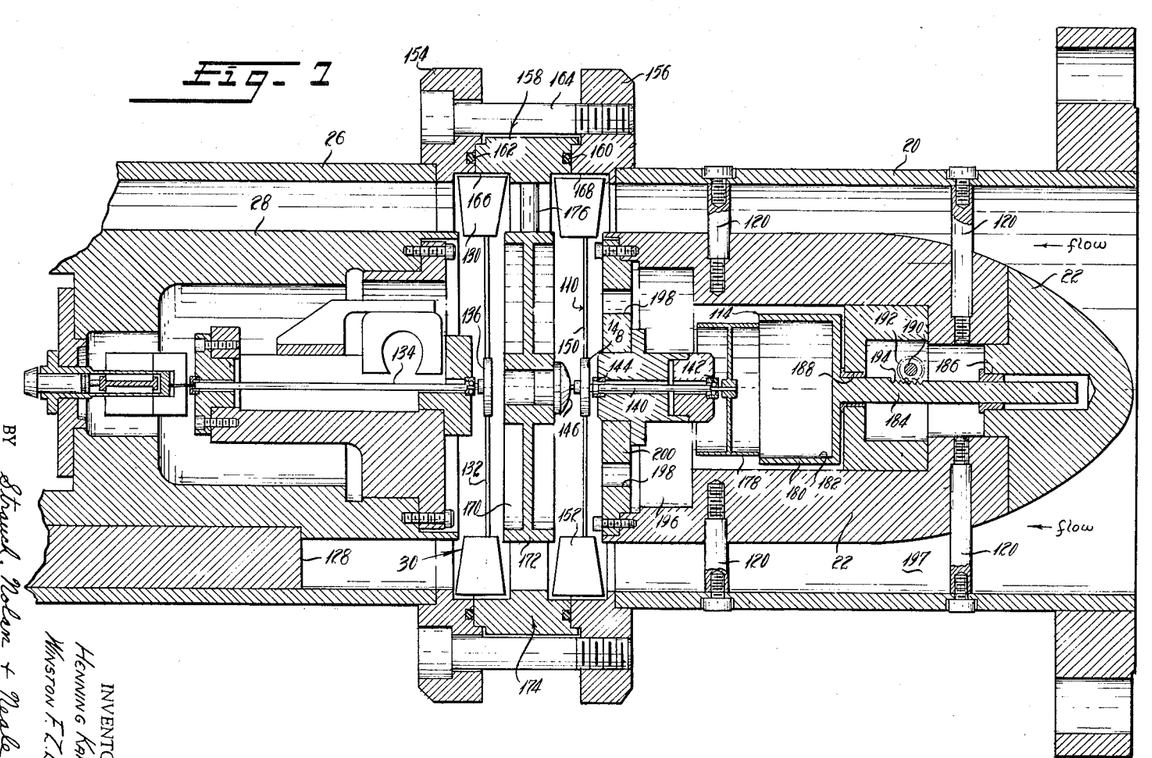
FIGURE 7 is a longitudinal sectional view of a turbine meter illustrating a further embodiment of the present invention equipped with a free counter-rotating turbine with a controlled drag device in the form of a viscous drag cup.

Referring now to FIGURE 7, another construction embodying the principles of the invention is illustrated and generally comprises a free spinning counter-rotating turbine indicated at 110 (henceforth called "free turbine") which is added at a proper distance in front and upstream from the metering turbine 30 and which is provided with an additional drag device generally designated at 114 in the form of a viscous drag cup as will be described.

With continued reference to FIGURE 7, therefore, the axial flow turbine meter therein shown comprises a cylindrical inlet conduit section 20 having a faired core section 22 supported coaxially therein by spaced struts 120 and an outlet conduit section 26 having a faired core section 28 supported coaxially therein by equiangularly spaced longitudinally extending rib 128. Core section 28 journals the meter turbine 30 and contains a drive train to a register (not shown). Since this structure is identical to the structure shown in said copending application Serial No. 717,863, no further description thereof will be given with the exceptions hereinafter described.

The exceptions referred to, which result from the fact that the flow direction through the meter of this application is opposite from that shown in said copending application, are (1) that the turbine 30 is turned around, that is, as compared with the turbine of said application Serial No. 717,863, each turbine blade 130 is rotated 180° about the axis of the one of the radiating spokes 132 on which it is mounted, and (2) that the shaft 134 on which the hub 136 of the turbine 30 is mounted is extended sufficiently to provide a clearance between the blades 130 and the adjacent end of core section 28.

To minimize the effect of fluid drag on the metering turbine 30 and thus to increase the metering accuracy thereof, the counter-rotating free turbine 110 is concentrically mounted on shaft 140 independently from metering turbine 30. The shaft 140 is journalled within core section 22 coaxial therewith and with turbine 30 by spaced radial sapphire bearing 142 and 144. Free turbine 110 is resiliently axially restrained against downstream movement by a resiliently backed sapphire thrust bearing carried by support 146.

Free turbine 110 is generally similar in construction to metering turbine 30, having a hub 148 from which radiate equiangularly spaced spokes 150, each supporting a blade 152 at its outer end. The relation between the blade angle of blades 152 is approximately equal and opposite to the blade angle for blades 130 relative to the common rotation axis for turbines 110 and 30 for a purpose as will hereinafter become apparent. The turbines 110 and 30 thus rotate in opposite directions at substantially the same angular velocity.

In order to prevent leakage of fluid around the turbines 110 and 30 so as to facilitate passage of substantially all the fluid through the turbines and thereby improve metering accuracy, annular members 154 and 156 are welded respectively to the adjacent ends of conduit sections 20 and 26. These annular members 154 and 156 are maintained in fixed axially spaced and axially aligned relation by piloting engagement with an annular spacer 158 interposed therebetween and maintained in fluid tight relationship therewith by recessed O-ring type gaskets 160 and 162, and are secured together by connecting equiangularly spaced machine screws 164. Members 154, 156 and 158 define internal annular recesses 166 and 168 proportioned and formed to receive the outer ends of blades 130 and 152 and form turbulent seals about the periphery of the turbine blades 130 and 152 respectively to prevent leakage of fluid to be metered around the turbines 110 and 30 without passing through the blades thereof. Spacer 158 is provided with an integral concentric hub 170 having an outside diameter at its periphery 172 equal to the outside diameter of the cylindrical portions of core sections 28 and 22 and supported coaxially therewith from the outer rim 174 by a plurality of equiangularly spaced radial spokes 176 of which there are preferably three. These spokes 176 are of such size, number and shape that they have no material effect on the fluid flow pattern between turbines 110 and 30.

The spacing between the free turbine 110 and meter turbine 30 is important in determining the overall performance of the turbine meter and is short enough so that the tangential component of the fluid exit velocity from the free turbine is not significantly reduced by the fluid friction when passing through the spacing. However, it is long enough so that the effect of the disturbance created upstream by the presence of the counter-rotating free turbine is small when it reaches the meter turbine. Experimental results indicate that this spacing should be at least equal to the chord length of the free turbine blades.

To supply a supplemental drag to free turbine 110, a cylindrical drum 178 is fixed to the end of shaft 140 opposite the end on which the turbine 110 is fixed. A cup 180, having a cylindrical recess 182 formed therein of such size to freely receive drum 178 therein, is provided with an integral coaxial shaft 184 guided by bearings 186 and 188 for axial sliding movement coaxial with shaft 140. Bearings 186 and 188 are suitably and conventionally mounted in the core section 22 as shown. The cup 180 may be shifted axially to the left as viewed in FIGURE 7 to surround a selected portion of the drum 178 by rotary manipulation of a shaft 190 which has a gear 192 fixed thereto and in constant mesh with a rack 194 formed on shaft 184.

The cavity 196 formed by core section 22, in which cup 180 and drum 178 are disposed, is in fluid communication with the annular channel 197 through which the fluid to be metered flows via the openings 198 on the end plate 200 of core section 22 so that cavity 196 becomes filled with fluid of the same viscosity as that being metered. The outside diameter of the drum 178 is sufficiently smaller than the diameter of recess 182 so that there is a slight radial clearance space between the outside of the drum 178 and the cylindrical wall of recess 182.

As the radial clearance space between the drum 178 and the cup 180 is filled with liquid, a supplemental drag is applied to the turbine 110, which drag is a function of the viscosity of the fluid, the radial depth of the clearance space and the surface of overlap of cup 180 relative to the drum 178. Although the amount of overlap is shown and described to be adjustable in connection with this embodiment, most installations are provided with an adjustment that is factory-set.

By this construction of the addition of the free-spinning turbine rotor 110 in front of the meter turbine 30 wherein the turbine 110 is free of any load other than the fluid friction acting upon it and the effects of the viscous drag drum and the fluid load of the turbine shaft bearings which is negligible, the tangential component of the absolute fluid exit velocity from the free turbine 110 will be a function of the viscosity of the fluid about to be metered. This tangential velocity component will, as the fluid to be metered enters the meter turbine 30, apply a supplemental driving force to the meter turbine. This supplemental driving force may be theoretically equal and opposite to the total resisting force acting on the meter turbine so that the absolute fluid exit angle and tangential component of the absolute exit velocity of the fluid from the blades 130 of the metering turbine are zero under ideal conditions. In practice, however, this ideal condition is not fully achieved but rather by the provision of the free counter rotating turbine 110 with the controlled viscous drag device 114, the discrepancy of registration attributable to the viscosity effect of the fluid is reduced to a point where it is negligibly small as will hereinafter become apparent.

Analysis shows that the accuracy of the turbine meter 30 is effected only by the difference of the resisting forces due to fluid friction acting on the meter turbine 30 and on the free turbine 110 and which are respectively designated as $F_f$ and $F_f'$. The accuracy of the turbine meter alone without the free turbine is effected by the absolute magnitude of the resisting force $F_f$ due to fluid friction acting on the meter turbine. This resisting force $F_f$ is substantially large and is of such magnitude as to result in substantial inaccuracies in metering fluids of high viscosity. However, the difference between the resisting forces due to fluid drag ($F_f$ minus $F_f'$) is by the present embodiment made sufficiently small for all flows within its operating range by controlling the viscous drag device 114 so that the resisting force $F_f'$ is equal to the resisting force $F_f$. The equivalancey of the fluid resisting forces can be accomplished by controlling the parameters which determine the amount of fluid friction acting on the free turbine. When such equivalency and magnitude is facilitated (i.e., $F_f'=F_f$), the accuracy of the turbine meter 30 becomes substantially independent of the viscosity of the fluid.

Figure 8:
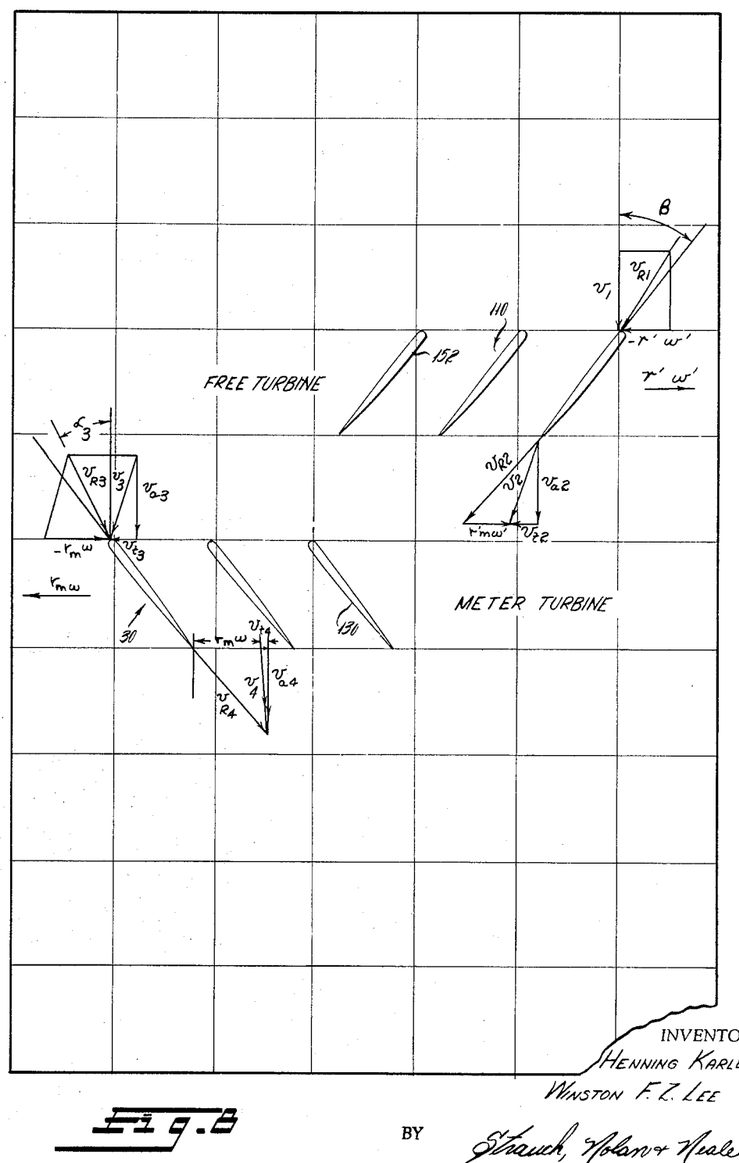
FIGURE 8 is a diagram illustrating the synchronous speed condition of the meter of FIGURE 7.

Referring to FIGURE 8, the effect of the free turbine 110 on the meter turbine 30 at synchronous condition is diagrammatically illustrated by velocity diagrams in relation to the blades 130 and 152 of the turbines. The velocity $v_1$ is the velocity of the fluid entering the free turbine and is assumed to be totally axial and uniformly distributed as hereinbefore described in the analysis of the type I turbine meter. The fluid thus entering the free turbine 110 with velocity $v_1$ causes it to turn with an angular velocity $\omega'$ so that the blades 152 move with a corresponding linear velocity of $r'\omega'$. Since the free turbine 110 has a resisting force $F_f'$ imposed upon it as a result of the fluid friction the fluid entering with the initial velocity $v_1$ undergoes a change in magnitude and direction as it passes through the free turbine so that it assumes an exit velocity designated at $v_2$. Similar to the analysis of the type I turbine meter, this exit velocity $v_2$ exiting from the free turbine 110 has a tangential velocity component $v_{t2}$ which directly evinces this slip of the free turbine due to its resisting forces. This exit velocity $v_2$ corresponds essentially to the inlet velocity $v_3$ to the metering turbine 30 and which is no longer totally axial but rather is provided with the tangential component $v_{t3}$ corresponding to the exit tangential component $v_{t2}$. The component velocity $v_{t3}$ is equal in magnitude and direction to the tangential component $v_{t2}$ of the free turbine outlet velocity.

Since the free turbine 110 is structurally similar to the metering turbine 30 but having its blades slanted in a direction that is opposite to that of the metering turbine, the metering turbine 30 therefore rotates with an angular velocity $\omega$ which is opposite in direction to the angular velocity $\omega'$ of the free turbine.

With continued reference to FIGURE 8, the fluid leaves the metering turbine 30 with an absolute velocity $v_4$ which will be very close to being purely axial in direction. In the ideal condition, velocity $v_4$ will be purely axial; however, it may have some very small tangential component $v_{t4}$. It will be apparent from the foregoing that the change in tangential velocity $\Delta v_t$ required to drive the metering turbine is, in accordance with the present embodiment of the invention, no longer reflected by a tangential component of the meter turbine outlet velocity $v_{t4}$, but rather, constitutes the change in tangential velocity from the non-axial velocity $v_3$ to the purely axial velocity $v_4$. Thus, where the tangential component $v_{t3}$ of the inlet velocity to the metering rotor is of the proper magnitude, it provides the driving force $F_d$ required to overcome the resisting forces $F_f$ due to fluid friction on the metering turbine 30 and the exit velocity $v_4$ from the metering turbine will always be purely axial. Further, where the tangential component $v_{t3}$ of the inlet velocity to the metering turbine 30 is made to vary in accordance with the fluid resisting forces $F_f$ on the metering turbine 30, the metering turbine will produce a constant ratio of turbine speed to flow rate $\omega/Q$.

In order to make the tangential component $v_{t2}$ of the free turbine outlet velocity of sufficient magnitude to overcome the metering turbine fluid resisting forces, the viscosity drag device 114 is utilized. The main reason for this is as follows: For fluids of very high viscosity, the Reynolds number is very low. At very low Reynolds number, the free turbine 110 has more slip than the meter turbine 30 since the latter has the help of the former. As the fluid friction is essentially proportional to the turbine speed, the fluid friction $F_f$ on the meter turbine will be greater than that $F_f'$ on the free turbine if the two turbines are similar and have the same amount of viscous drag surface. This difference in the fluid frictions ($F_f - F_f'$) can be greatly reduced by providing the free turbine 110 with a proper amount of additional viscous drag surface which is in excess of the viscous drag surface on the meter turbine and this is accomplished by providing an additional viscous drag surface in the form of the viscous drag drum 178 shown in FIGURE 7 and hereinbefore described. The desirable amount of additional viscous drag surface provided for by utilization of the drag drum 178 is obtained by adjusting the axial position of the non-rotating cup 180 with respect to the rotating drum 178 of the free turbine 110. Consequently, the free turbine of FIGURE 7 compensates for the viscosity effect below the critical Reynolds number (laminar flow range) as well as above the critical Reynolds number.

Figures 9, 10:
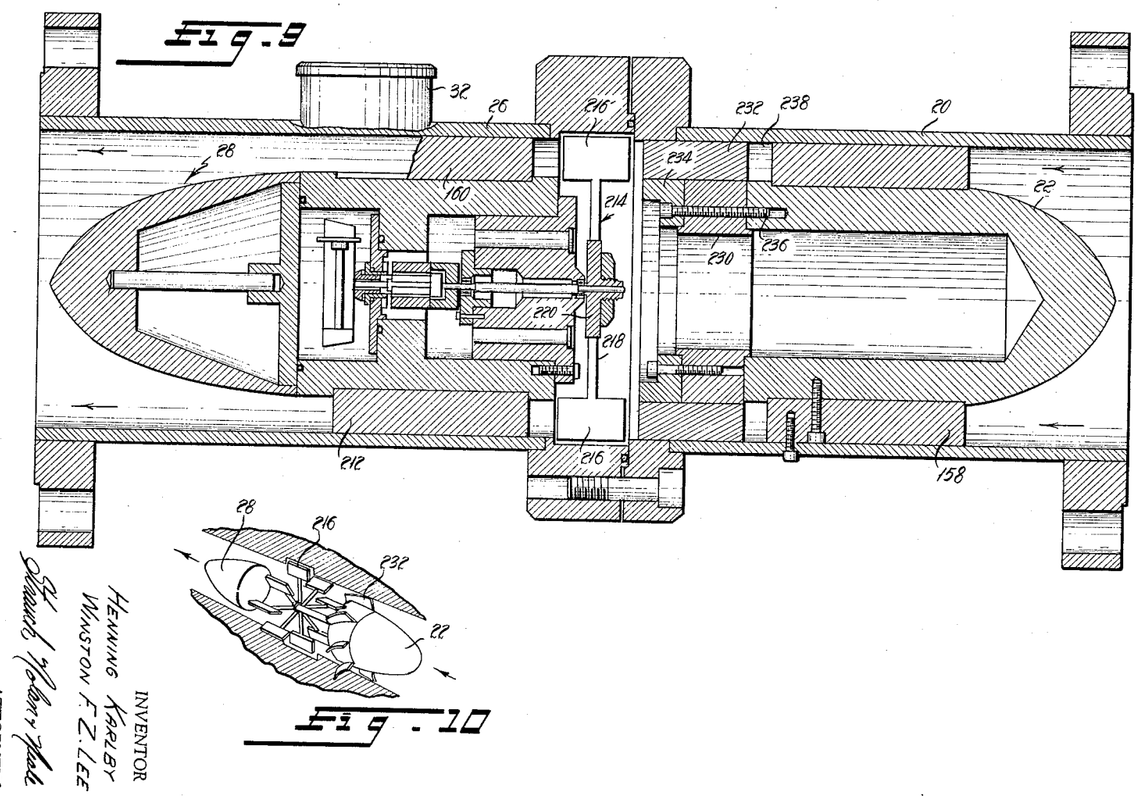
FIGURE 9 is a longitudinal sectional view of a turbine meter illustrating a further embodiment of the present invention.
FIGURE 10 is a detailed longitudinally exploded view of the embodiment of FIGURE 9 with the meter casing broken away and the parts therein axially separated for clarity.
Figure 11:
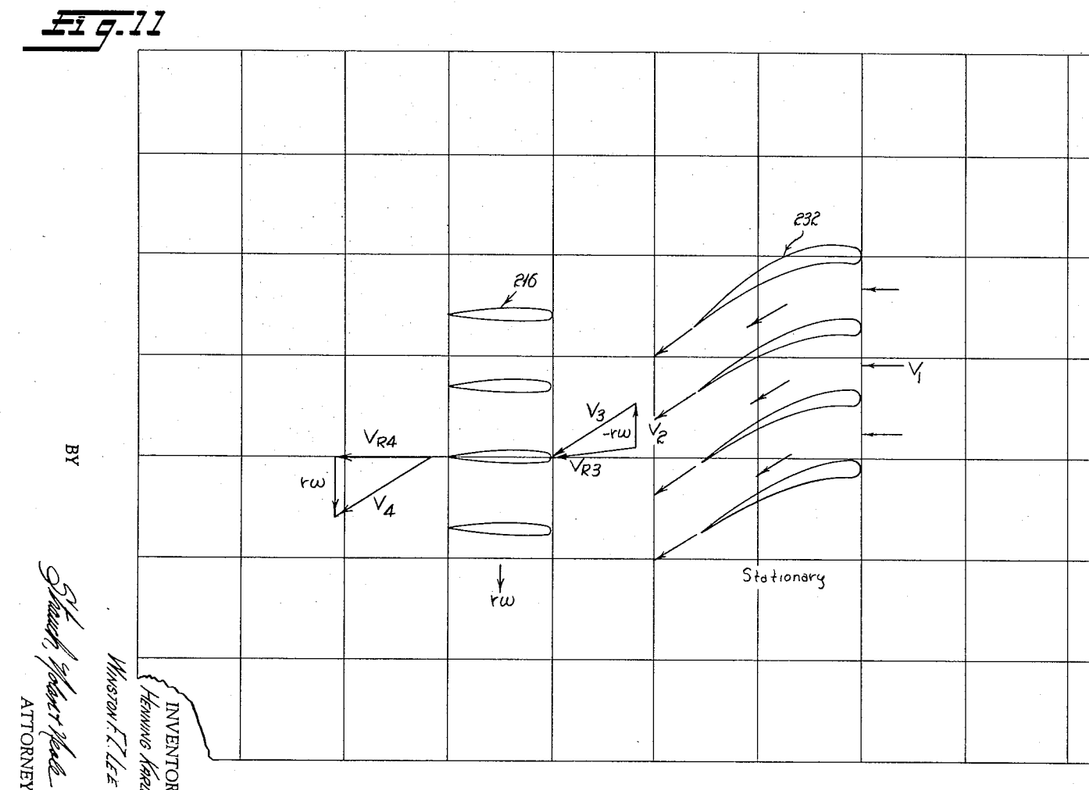
FIGURE 11 is a diagrammatic circumferential development of the metering turbine and guide vanes of the embodiment of FIGURE 9.
Figure 12:
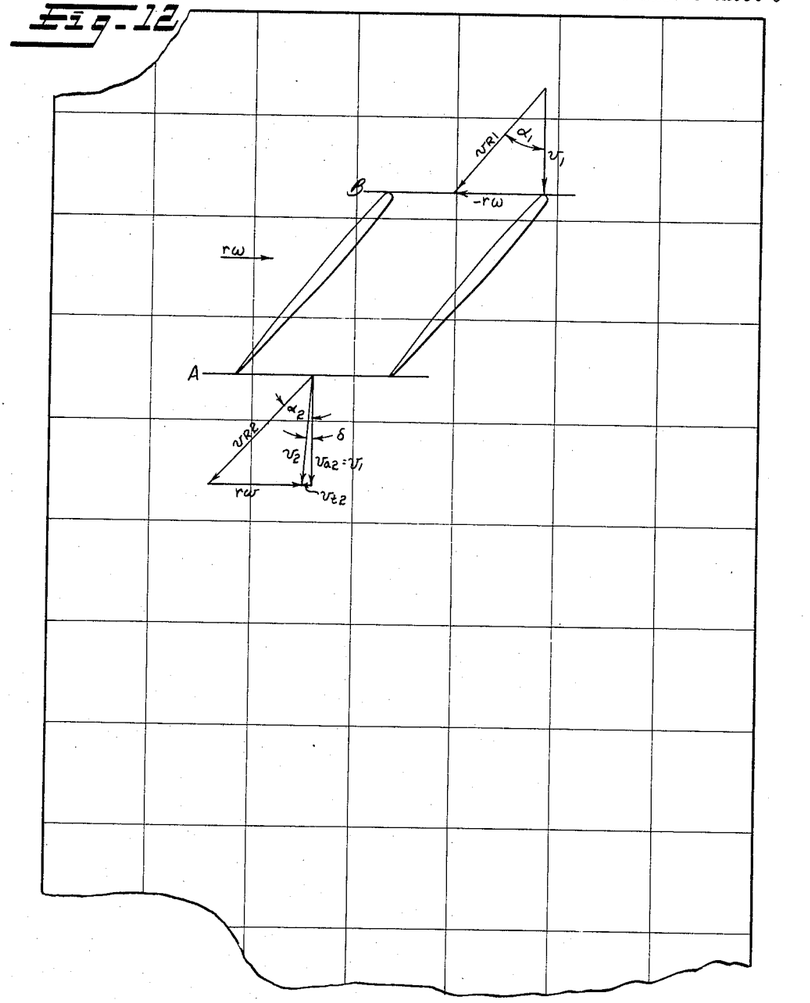
FIGURE 12 is a vectorial diagram illustrating velocities at synchronous speed for a meter which does not compensate for fluid viscosity.

Still another embodiment of the invention is illustrated in FIGURES 9–11 and is for the most part identical with the structure disclosed in said copending application Serial No. 717,863. The turbine meter illustrated therein comprises a cylindrical inlet conduit section 20 having a faired core section 22 and an outlet conduit section 26 having a faired core section 28. Core sections 22 and 28 are respectively supported coaxially by equiangularly spaced longitudinally extending ribs 210 and 212. Core section 28 journals a meter turbine 214 and contains a drive train to a register 32. Since this structure is identical to that disclosed in said copending application Serial No. 717,863 with the exception of the turbine 214, no further description thereof will be given.

The turbine 214 comprises a plurality of longitudinally extending blades 216 of zero blade angle spaced equiangularly apart and individually supported by spokes 218 which radiate from a central hub 220. Mounted on an annular core section 230 adjacent to and upstream of turbine 214 are a plurality of fixed guide vanes 232 equiangularly spaced apart relative to the axis of turbine 214 and curved to impart a selected direction of inlet fluid velocity to the turbine rotor with least disturbance (FIGURE 11). The annular core section 230 is coaxial with the turbine 214 and is mounted between the inner end of the faired core section 22 and collar 234 by machine screws 236. Thus, fluid to be metered passes into the annular channel 238 and is directed into the turbine 214 by the fixed vanes 232.

Referring now to FIGURE 11, the blade angle of the individual turbine blades 216 of the metering turbine 214, as measured from the axial direction, is shown to be reduced to zero as hereinbefore described. By the addition of the stationary flow directing guide vanes 232 upstream of the metering turbine, a tangential component to the inlet velocity of the fluid entering the metering turbine is obtained. As hereinbefore discussed in the analysis of the type I turbine meter, the resisting forces due to the fluid friction $F_f$ on the turbine blades act along the surface of the blades. Due to considerations of fluid dynamics, the blades of the type I meter are provided with a blade angle $\beta$ measured from the axial direction which is in the range of 20° to 60°. By this type I meter blade construction, it will be appreciated that since the fluid frictional resisting forces $F_f$ act along the surfaces of the blades, then they have a substantial component ($F_f \sin \beta$) which acts in a tangential direction to oppose the rotation of the turbine and cause turbine slip.

In the metering turbine with a zero blade angle as described in the embodiment of FIGURES 9–11 of the present invention, the tangential component of the fluid friction resisting force $F_f$ is consequently zero ($F_f \sin 0° = 0$) and the entire force $F_f$ due to fluid friction is taken up by the low-friction thrust bearings of the turbine. Since the thrust on the low-friction bearings due to the fluid force $F_f$ produces only very small resistance to the rotation of the turbine because of the extremely low coefficient of bearing friction on the small moment arms at the bearings, it produces no appreciable metering inaccuracies. Thus, the zero blade angle turbine is subject to much less viscosity effect than the turbines with substantial blade angles.

In order to drive the zero blade angle turbine 214, stationary flow directing vanes 232 function to establish a tangential velocity component to the fluid entering the turbine so that the turbine will be driven at speeds acceptable for accurate metering.

With continued reference to FIGURE 11 which shows the blade profiles of the stationary vanes 232 and the zero blade angle turbine 214, the fluid enters the stationary vanes or stator 232 with a velocity $V_1$ which is purely axial and uniformly distributed. The stationary vanes 232 efficiently redirect the fluid so that it emerges with an exit velocity $V_2$ which has a tangential velocity component. This redirected velocity $V_2$ becomes the turbine inlet velocity $V_3$ and provides the driving force which drives the metering turbine 214 with an angular velocity $\omega$ and the blades 216 with a linear velocity $r\omega$. By this construction, the turbine exit fluid velocity $V_{R4}$ relative to the blades 216 of the turbine is axial. Thus, the fluid resisting force $F_f$ acting along the surface of the blade exerts no restraining force opposite to the direction of rotation of the turbine, but rather, causes only an increased thrust on the turbine bearings.

The foregoing discussion has revealed that the turbine meter of the type disclosed in said copending application Serial No. 717,863 (or type I turbine meter) cannot give a flat Reynolds number accuracy curve when the flow is in transition zone or in laminar range (FIGURES 3 and 4). Thus, where highly accurate flow measurements are required over a reasonable flow range for fluids of high viscosity, the type I turbine meter must be modified in accordance with the present invention in order to flatten the Reynolds number accuracy curve in the region of the critical Reynolds number.

The present invention has disclosed four practical applications by which this modification is accomplished. FIGURES 1 and 2 illustrate the employment of turbulence generating means to lower the critical Reynolds number of the fluid and thereby extend the linear flow measurement range. The second application illustrated in FIGURE 5 provides for the employment of a controlled viscous drag device on the metering turbine to create a controlled viscous drag to bring down the hump of the Reynolds number accuracy curve which exists naturally in the type I turbine meter. The third application illustrated in FIGURE 7 provides for the employment of means for providing the metering turbine with a supplementary driving force to overcome the effect of the fluid drag on the metering turbine, thus minimizing the turbine slip due to fluid friction of the metering turbine which in turn results in minimizing the viscosity effect of the fluid being metered. The last application disclosed by the present invention is illustrated in FIGURES 9-11 and provides for the employment of a longitudinal extending zero blade angle turbine. By this structure, the tangential component of the profile drag is zero and thus no effective resistance to the turbine rotation by the effect of fluid friction is exerted on the blades of the turbine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an axial flow turbine meter for use in accurately metering viscous fluids, a housing, means defining an annular passageway through said housing, a metering turbine having a plurality of blades movable in a concentric path within said passageway in response to flow of fluid, and means for imposing a slip on said turbine, the magnitude of which is substantially equal at the meter critical Reynolds number to the difference between the slip imposed on said turbine in the turbulent flow range of Reynolds number and the slip normally imposed on said turbine at the critical Reynolds number, said means for imposing said slip on said turbine comprising controlled viscous drag means including a member operatively connected to said turbine to rotate therewith, said member having a surface of selected magnitude arranged to be disposed in the path of a portion of the fluid to be metered, and means for transporting a measured amount of fluid entering said housing over said surfaces of said member to establish a viscous shear force resisting rotation of said member thereby generating the slip imposed on said turbine, said viscous drag means further comprising a cup, said member constituting a drum having its cylindrical surface exposed to the fluid to be metered, said drum being concentrically mounted within said cup in predetermined spaced apart relation thereto so that the annular clearance between said drum and said cup is of such magnitude as to establish a laminar viscous shear drag therein.

2. In a turbine meter, a tubular housing, means within said housing defining with said housing an annular flow path and comprising axially aligned central upstream and downstream core sections, a turbine rotor mounted between said core sections with its blades disposed across the annular flow passage and journalled for rotation in response only to fluid flow through said annular passage, means actuated by said rotor for counting the rotor revolutions to thereby register the quantity of fluid flowing through said housing, and a viscosity compensation device operable to impose a variable drag upon said turbine rotor that is continuously proportional to the viscosity of the fluid being metered.

3. In a turbine meter as defined in claim 2, said annular flow path being a venturi of hollow form, said core sections being hollow and said viscosity compensation device being located within one of said cores.

4. In a turbine meter, a tubular housing, means in said housing defining an annular flow passage therethrough and comprising a pair of axially aligned, spaced apart centrally located hollow upstream and downstream core sections, a turbine rotor journalled between said core sections and rotatable in response to flow of fluid through said annular passage, means driven by said turbine rotor for registering the quantity of fluid passing through the blades of said rotor including a drive train assembly providing transmission of mechanical movement from said turbine rotor, said drive train being driven by said rotor and disposed within one of said core sections, and a viscosity compensation device disposed in the other of said core sections and operable to impose a variable drag upon said turbine rotor that is continuously proportional to the viscosity of the fluid being metered.

5. In an axial flow turbine meter for accurately measuring the flow of viscous fluids, a tubular housing, means within said housing defining an annular flow passage therethrough and comprising upstream and downstream hollow central core sections, a peripherally bladed turbine rotor having its blades extending radially into said annular passage in the path of fluid flow therethrough and rotatable in response to movement of fluid through said housing, means operable upon rotation of said turbine rotor for indicating the quantity of fluid passing through the blades of said rotor, and a viscosity compensation device comprising means defining an internal surface of revolution of predetermined axial extent, a drum journalled within said surface defining means coaxial with said surface and having an external surface of revolution closely uniformly spaced from said internal surface of revolution, means drive coupling said drum to said rotor, means permitting passage of line fluid being metered into and through said space between said surfaces of revolution, said surfaces of revolution coacting with the line fluid therebetween to impose a variable drag upon said turbine rotor continuously proportional to the viscosity of the fluid being metered.

6. In an axial flow turbine meter as defined in claim 5, said internal surface of revolution defining means being located within one of said cores, and said line fluid pasage permitting means being effective to permit passage of a measured amount of line fluid.

7. In a turbine meter, a tubular housing, means within said housing defining an annular fluid flow passage therethrough and including upstream and downstream hollow core sections, a peripherally bladed turbine rotor journalled coaxially between said core sections and having its blades extending radially into said annular passage in the path of fluid flow therethrough and rotatable in response to movement of fluid through said housing, means operable upon rotation of said turbine rotor for counting the number of revolutions of said rotor and thereby indicating the quantity of fluid passing through the blades of said rotor including a drive train in one of said core sections having an input drive connected to said rotor, and a viscosity compensation device subjectable to the fluid being metered and operable to impose a variable drag upon said turbine rotor that is continuously proportional to the viscosity of the fluid being metered, said viscosity compensation device being mounted in the other of said core sections and having an output connected to said rotor.

8. In a turbine meter adapted to be disposed in a fluid pipeline for accurately measuring the flow of fluid therethrough, a tubular housing, means within said housing defining an annular fluid flow passage therethrough including upstream and downstream coaxial hollow core sections, a peripherally bladed turbine rotor journalled between said core sections and rotatable in response to flow of fluid through said annular passage, means operable upon rotation of said turbine rotor to count the number of revolutions of said rotor and thereby indicate the quantity of fluid flowing through said housing, and a viscosity compensation device in one of said core sections comprising means within said one core section defining an internal surface of revolution of predetermined axial extent, a drum journalled within said surface having an external surface of revolution coaxially closely uniformly spaced from said internal surface of revolution, means drive coupling said drum to said rotor, means for permitting the passage of a measured amount of fluid being metered to pass through the space between said surfaces of revolution from a point in the fluid pipeline upstream of said housing and means for discharging the line fluid from said space between said surfaces of revolution into said annular passage upstream of the turbine rotor, said surfaces of revolution coacting with the line fluid therebetween to impose a variable drag upon said turbine rotor continuously proportional to the viscosity of the fluid being metered.

9. A turbine meter comprising a housing containing a rotatably mounted, bladed turbine metering rotor for driving a register means or the like, means for directing fluid to be metered into the blades of said rotor to impart drive torque to said rotor, the fluid passing through the blades of said rotor imposing a variable fluid drag on said rotor, viscosity compensating means including a pair of elements having opposed, spaced apart surfaces, means coupling one of said elements to said rotor for rotation therewith relative to the other of said elements, and means for transporting at least a portion of the fluid being metered between said opposed surfaces of said elements, said surfaces being arranged sufficiently close to each other and having such related areas that they coact upon rotation of said one element relative to the other element to apply to said one element and said rotor a viscous shear drag of variable, predetermined magnitude, the combined effect of said drags being to produce a substantially constant number of revolutions of the rotor per unit volume of fluid flowing through the rotor throughout a range of flow rates extending into the meter range of flow rates between laminar and turbulent flow.

10. The turbine meter defined in claim 9 wherein the fluid is directed by said fluid directing means into said rotor blades in an annular stream extending parallel to the axis of rotor rotation.

11. The turbine meter defined in claim 10 wherein said surfaces are cylindrical and substantially coextensive.

12. The turbine meter defined in claim 11 wherein the clearance between said surfaces is sufficiently small that the flow rate of fluid therebetween is laminar regardless of the flow rate in said annular stream within the meter operating range.

13. The turbine meter defined in claim 10 wherein said fluid directing means comprises a core structure coaxially mounted in said housing and defining the inner boundary of said annular stream, said one element being received in a member forming a part of said core structure.

14. The turbine meter defined in claim 13 wherein said one element comprises a drum and wherein said member defines said other element.

15. The turbine meter defined in claim 9 wherein said surfaces are sufficiently close that the flow rate of fluid through the space between said surfaces is laminar throughout the meter operating range regardless of the flow rate of fluid through said rotor.

16. The turbine meter defined in claim 9 wherein said viscous shear force is continuously proportional to the velocity of the fluid flowing through the space between said surfaces throughout the meter flow rate range.

17. The turbine meter defined in claim 9 wherein the magnitude of said viscous shear drag decreases as the fluid flow rate through said rotor increases from the critical Reynolds number of the fluid being metered.

18. The turbine meter defined in claim 9 wherein said surfaces are cylindrical and concentric and are disposed in coaxial relation with the rotational axis of said rotor.

References Cited by the Examiner

UNITED STATES PATENTS

| | | | |
|---|---|---|---|
| 470,814 | 3/1892 | Abrahams | 73—231 |
| 1,020,127 | 3/1912 | Coleman | 73—230 |
| 1,303,443 | 5/1919 | Wohlenberg | 73—230 |
| 1,624,095 | 4/1927 | Fries | 73—231 |
| 3,053,086 | 9/1962 | Granberg | 73—230 |
| 3,135,116 | 6/1964 | Kwong et al. | 73—231 |

FOREIGN PATENTS

| | | |
|---|---|---|
| 14,060 | 4/1852 | Great Britain. |
| 221,915 | 9/1924 | Great Britain. |
| 758,094 | 9/1956 | Great Britain. |

OTHER REFERENCES

Effect of Edge Thickness on Small Orifice Meters by Thrasher et al. Instruments and Automation—November 1954 vol. 27—pp. 1810 and 1811.

RICHARD C. QUEISSER, *Primary Examiner.*

C. A. CUTTING, ROBERT EVANS, *Examiners.*

S. C. SWISHER, C. I. McCLELLAND, E. D. GILHOOLY, *Assistant Examiners.*